(12) United States Patent
Baeurle et al.

(10) Patent No.: US 11,724,419 B2
(45) Date of Patent: Aug. 15, 2023

(54) FIBRE-LAYING MACHINE AND METHOD FOR PRODUCING LAID FIBRE SCRIMS

(71) Applicant: Broetje-Automation GmbH, Rastede (DE)

(72) Inventors: Armin Baeurle, Koenigsbronn (DE); Sebastian Haupt, Kirchheim (DE); Tobias Vester, Zell unter Aichelberg (DE); Matthias Meyer, Goeppingen (DE); Michael Fink, Kirchheim (DE)

(73) Assignee: Broetje-Automation GmbH, Rastede (DE)

( * ) Notice: Subject to any disclaimer, the term of this patent is extended or adjusted under 35 U.S.C. 154(b) by 286 days.

(21) Appl. No.: 15/113,236

(22) PCT Filed: Oct. 13, 2014

(86) PCT No.: PCT/EP2014/071837
§ 371 (c)(1),
(2) Date: Jul. 21, 2016

(87) PCT Pub. No.: WO2015/110187
PCT Pub. Date: Jul. 30, 2015

(65) Prior Publication Data
US 2017/0008197 A1    Jan. 12, 2017

(30) Foreign Application Priority Data
Jan. 22, 2014   (DE) .................... 10 2014 201 060.8

(51) Int. Cl.
*B29C 31/00*    (2006.01)
*B29C 70/38*    (2006.01)
(Continued)

(52) U.S. Cl.
CPC .......... *B29C 31/006* (2013.01); *B29C 70/382* (2013.01); *B29C 64/194* (2017.08);
(Continued)

(58) Field of Classification Search
CPC ... B29C 31/006; B29C 70/382; B29C 64/194; B29C 64/307; B29C 70/38; B29C 70/384; B29C 70/386; B29C 70/388
See application file for complete search history.

(56) References Cited

U.S. PATENT DOCUMENTS 3,574,040 A * 4/1971 Chitwood et al. .... B29C 70/386
156/522
4,133,711 A * 1/1979 August ................. B29C 70/545
156/367
(Continued)

FOREIGN PATENT DOCUMENTS

CN     103361886     10/2013
DE        280487      3/1996
(Continued)

OTHER PUBLICATIONS

First Office Action for Chinese Patent Application No. 201480077405. 3, dated Jun. 5, 2018 (11 pages) with English translation.
(Continued)

*Primary Examiner* — Seyed Masoud Malekzadeh
(74) *Attorney, Agent, or Firm* — Pauly, DeVries Smith & Deffner LLC

(57) ABSTRACT

A fiber laying machine for producing laid fiber scrims has a tool table for positioning a mold, said tool table being linearly displaceable in an x direction by means of an x carriage and being pivotable about a vertical pivot axis. Arranged above the tool table is a fiber laying head which is linearly displaceable transversely to the x direction by means of a y carriage. Since the fiber laying head is linearly displaceable, the arrangement of the tool table on the machine frame is comparatively easy, and so laid fiber scrims are producible quickly and efficiently. In particular, automatic loading and unloading of the tool table is easily possible.

13 Claims, 5 Drawing Sheets

(51) Int. Cl.
*B29C 64/307* (2017.01)
*B29C 64/194* (2017.01)

(52) U.S. Cl.
CPC ............ *B29C 64/307* (2017.08); *B29C 70/38* (2013.01); *B29C 70/384* (2013.01); *B29C 70/386* (2013.01); *B29C 70/388* (2013.01)

(56) References Cited

U.S. PATENT DOCUMENTS

| | | | | |
|---|---|---|---|---|
| 4,200,271 A * | 4/1980 | August | ................ | B29C 70/386 269/21 |
| 4,208,238 A * | 6/1980 | August | ................ | B66C 19/00 156/523 |
| 4,292,108 A * | 9/1981 | Weiss | ................ | B26D 11/00 156/271 |
| 4,351,688 A * | 9/1982 | Weiss | ................ | B29C 70/545 156/523 |
| 4,735,672 A * | 4/1988 | Blad | ................ | B29D 28/005 156/361 |
| 5,022,952 A * | 6/1991 | Vaniglia | ................ | B29C 70/388 156/441 |
| 5,228,944 A * | 7/1993 | Seifried | ................ | B32B 38/1808 156/197 |
| 5,397,415 A * | 3/1995 | Manabe | ................ | B29C 70/545 156/247 |
| 5,764,521 A * | 6/1998 | Batchelder | ................ | B29C 48/92 425/149 |
| 5,936,861 A * | 8/1999 | Jang | ................ | B33Y 70/10 700/98 |
| 8,667,999 B2 * | 3/2014 | Hamlyn | ................ | B29C 70/382 156/433 |
| 9,375,907 B2 * | 6/2016 | Boge | ................ | B25J 5/02 |
| 9,409,350 B2 * | 8/2016 | Hamlyn | ................ | B29C 70/382 |
| 2002/0019683 A1 * | 2/2002 | White | ................ | B33Y 40/00 700/255 |
| 2005/0248065 A1 * | 11/2005 | Owada | ................ | B29C 64/106 264/494 |
| 2006/0156978 A1 * | 7/2006 | Lipson | ................ | B33Y 50/00 438/3 |
| 2011/0074065 A1 * | 3/2011 | Batchelder | ................ | B33Y 40/00 264/308 |
| 2011/0259515 A1 * | 10/2011 | Rotter | ................ | B29C 73/32 156/60 |
| 2011/0272126 A1 * | 11/2011 | Hamlyn | ................ | B29C 70/382 165/177 |
| 2011/0277935 A1 * | 11/2011 | Borgmann | ................ | B29C 70/38 156/350 |
| 2012/0006475 A1 * | 1/2012 | Colombo | ................ | B29C 70/388 156/243 |
| 2013/0089642 A1 * | 4/2013 | Lipson | ................ | B33Y 10/00 426/115 |
| 2013/0153154 A1 * | 6/2013 | Boge | ................ | B25J 5/02 156/510 |
| 2014/0060742 A1 * | 3/2014 | Hamlyn | ................ | B29C 70/384 156/538 |
| 2014/0182787 A1 * | 7/2014 | Caffiau | ................ | B29C 70/384 156/433 |
| 2015/0314531 A1 * | 11/2015 | Mark | ................ | B29C 64/209 264/241 |
| 2019/0009472 A1 * | 1/2019 | Mark | ................ | B29C 64/393 |

FOREIGN PATENT DOCUMENTS

| | | |
|---|---|---|
| DE | 10134852 | 8/2002 |
| DE | 102010039955 | 3/2012 |
| EP | 2349689 | 12/2013 |
| JP | S5734915 | 2/1982 |
| WO | 2009042225 | 4/2009 |
| WO | 2012126815 | 9/2012 |

OTHER PUBLICATIONS

"German Search Report," for German Patent Application No. 102014201060.8, dated Oct. 10, 2014 (8 pages).

"International Search Report and Written Opinion," for PCT/EP2014/071837 dated Apr. 2, 2015 (17 pages).

* cited by examiner

FIBRE-LAYING MACHINE AND METHOD FOR PRODUCING LAID FIBRE SCRIMS

CROSS-REFERENCE TO RELATED APPLICATIONS

This application is a national stage application under 35 U.S.C. 371 of Inter-national Patent Application Serial No. PCT/EP2014/071837, entitled "Faserlegemaschine and Verfahren zur Herstellung von Fasergelegen," filed Oct. 13, 2014, which claims priority from German Patent Application No. DE 10 2014 201 060.8, filed Jan. 22, 2014, the disclosures of which are incorporated herein by reference.

FIELD OF THE TECHNOLOGY

The document relates to a fiber laying machine for producing laid fiber scrims. Furthermore, the document relates to a method for producing laid fiber scrims.

BACKGROUND

WO 2009/042 225 A2 discloses a fiber laying machine for producing laid fiber scrims. The fiber laying machine has a triaxial table, which, relative to a fiber laying head, is rotatable about a vertical rotation axis and linearly displaceable in two directions. Arranged on the triaxial table is a vacuum table, which serves as a smooth tool surface. Above the vacuum table, the fiber laying head is arranged fixedly on a machine frame and has guide rails for a fiber tape, said guide rails being movable in a vertical direction by means of a linear actuator, in order to feed the fiber tape to the tool surface.

SUMMARY

The disclosure is based on the object of creating a fiber laying machine which allows the production of laid fiber scrims in an easy, flexible and efficient manner.

This object is achieved by a fiber laying machine having the features as described herein. Since the fiber laying head is linearly displaceable in the horizontal y direction above the tool table by means of the y carriage, in order to produce laid fiber scrims, the tool table merely has to be linearly displaceable in the x direction extending transversely or perpendicularly to the y direction and pivotable about the vertically extending pivot axis, so as to be able to produce laid fiber scrims with any desired fiber orientation. As a result of this axis arrangement, it is easily possible to position the tool table, including the mold arranged thereon. This is associated with quick loading and unloading, such that the fiber laying machine exhibits high productivity. In particular, as a result of the tool table being displaceable only in the x direction, quick and easy automatic loading and unloading is possible. Since the fiber laying head is displaceable only linearly, i.e. the fiber laying head does not have a vertically extending pivot axis, the fibers are not twisted while they are supplied and fed, and so fibers to be laid can be fed quickly and easily to the fiber laying head.

The x carriage, the y carriage, the fiber laying head and/or the fiber supply unit can be arranged on the machine frame. In order to feed the fiber laying head to the tool table or the mold arranged thereon, the fiber laying head can be linearly displaceable in the vertical z direction. The x carriage can be linearly displaceable from a loading side to an unloading side in order to automatically load and unload the tool table. Furthermore, the tool table arranged on the x carriage is rotatable about the pivot axis or axis and is embodied as a c axis. In some embodiments, the fiber laying head is exchangeable.

A fiber laying machine as described herein ensures efficient production of laid fiber scrims. Since the x carriage is linearly displaceable from the loading side to the unloading side of the machine frame, the tool table can be loaded and unloaded automatically. To this end, the tool table is provided in particular with receptacles which clamp a mold pallet, having a mold for the deposition of fibers, by means of zero-point clamping systems or zero-point clamps. In particular, the fiber laying machine can be loaded and/or unloaded with molds, or mold pallets having molds arranged thereon, in parallel with the main production time, that is to say during fiber laying. A mold to be coated is, on the one hand, already available for loading the tool table when a mold arranged on the tool table is still being coated. On the other hand, a coated mold is unloaded from the tool table and kept available for further unloading from the fiber laying machine, wherein the tool table is ready to be used, or is used, for the production of a further laid fiber scrim independently of the further unloading of the coated mold. Accordingly, the fiber laying machine has, along its x axis, zones for loading and unloading at the end sides, and in between, i.e. beneath the y axis, a zone for the deposition of fibers. The machine frame can have a machine bed which extends in the x and y directions and on which the x carriage is linearly displaceable or on which the x guide rails are arranged. The loading side and the unloading side can be arranged on opposite sides relative to the tool table.

A fiber laying machine as described herein ensures efficient production of laid fiber scrims. Since the tool table has a plurality of clamping units, mold pallets having molds arranged thereon can be clamped and released quickly and easily for loading and/or unloading the tool table. The clamping units clamp the mold pallets mechanically and are configured for example as zero-point clamps. The clamping units can be actuable electromechanically, hydraulically or pneumatically.

A fiber laying machine as described herein ensures quick and easy loading and/or unloading of the tool table. In various embodiments, a first pallet handling unit is arranged on the loading side and a second pallet handling unit is arranged on the unloading side of the machine frame. The at least one pallet handling unit is configured in particular as a pallet lifting unit which allows mold pallets to be raised and lowered in the z direction.

In order to automatically load the tool table, a mold pallet having a mold to be coated is kept available in a raised position by the first pallet handling unit. The empty tool table is displaced in the x direction to the loading side and under the available mold pallet. Subsequently, the mold pallet is lowered by the first pallet handling unit and the mold pallet is clamped for example by means of the clamping units. The loaded tool table is now displaced in the x direction to the fiber laying head and the mold arranged on the mold pallet is coated with fibers. Once fiber laying is complete, the tool table is displaced in the x direction to the unloading side. The second pallet handling unit is located there in a lowered position. For unloading, the mold pallet is released from the tool table for example by means of the clamping units. Since the mold pallet has been displaced over the second pallet handling unit by means of the tool table, the mold pallet is unloaded by the second pallet handling unit being transferred from the lowered position into a raised position. The empty tool table can now be displaced back to the loading side, where the first pallet handling unit holds a further mold pallet available. The second pallet handling unit can be unloaded in parallel with the loading of the tool table, and so the second pallet handling unit is available for the next unloading of the tool table.

A fiber laying machine as described herein ensures easy and efficient production of laid fiber scrims. The cross member ensures easy displacement of the fiber laying head in the y direction without the displacement of the tool table being hampered. To this end, in particular an associated passage opening for the tool table is formed beneath the at least one cross member, such that said tool table is displaceable in the x direction from the loading side to the unloading side. The at least one cross member can be connected at both ends to a machine bed of the machine frame. As a result, the at least one cross member has high mechanical rigidity, and so high fiber laying speeds and thus high productivity in the production of laid fiber scrims is easily achieved.

A fiber laying machine as described herein ensures easy and efficient production of laid fiber scrims. The y carriage is mounted in a displaceable manner on the two cross members such that the fiber laying head is arranged between the cross members. As a result, forces that act on the fiber laying head can be transferred into the machine frame without the machine frame being deformed. In various embodiments, the two cross members are fastened to a machine bed of the machine frame at their respective ends by way of longitudinal supports. This allows quick and easy fiber laying.

A fiber laying machine as described herein allows quick and easy feeding of the fiber laying head to the respective mold and in particular flexible production of three-dimensional laid fiber scrims. The fiber laying head is displaceable in particular at least 200 mm, in particular at least 400 mm, and in particular at least 600 mm in the z direction by means of the z carriage. In order to produce three-dimensional laid fiber scrims, the control unit is configured such that the fiber laying head is displaceable not only in order to be fed in the z direction, but also during fiber laying such that a three-dimensional, i.e. non-planar surface of a mold is coatable with fibers. The fiber laying head is displaceable within its stroke, in particular at least 50 mm, in particular at least 100 mm, and in particular at least 150 mm in the z direction, during fiber laying. In various embodiments, the fiber laying head is arranged in an exchangeable manner on the z carriage. As a result, the availability of the fiber laying machine and thus the flexibility and productivity thereof is increased. The fiber laying head can additionally be pivotable about a pivot axis extending parallel to the x direction, such that an a axis is formed for fastening the fiber laying head. The laid fiber scrim can as a result have comparatively larger dimensions in the z direction, i.e. be curved more greatly.

A fiber laying machine as described herein ensures quick and efficient production of laid fiber scrims. The fiber laying head is moved unidirectionally in the y direction during fiber laying. Since the at least one deflection element and the at least one fiber package store are arranged opposite one another relative to the fiber laying head, the fibers to be laid are pulled out of the at least one fiber package store for the following fiber laying operation in the starting position of the fiber laying head, or in the starting position of the y carriage. In various embodiments, the at least one deflection element is arranged on the y carriage. For example, the at least one deflection element is at a greater distance from the at least one fiber package store than the fiber laying head in the y direction. Since the fibers have already been pulled out of the at least one fiber package store in the starting position of the fiber laying head, i.e. at the start of fiber laying, the fiber laying head can be displaced quickly in the y direction during fiber laying. Since the fiber laying head is moved toward the at least one fiber package store during fiber laying, the fibers do not have to be conveyed or pulled further out of the at least one fiber package store during fiber laying. If the fiber laying head is displaced back into its starting position again after a fiber laying operation, the fibers are pulled out of the at least one fiber package store for the next fiber laying operation. As a result, there is the additional possibility of conveying fibers as uniformly as possible out of the at least one fiber package store, wherein dynamic effects are compensated by the dancer magazine. Since the fibers do not have to be laid simultaneously during extraction, extraction is comparatively unproblematic. In various embodiments, the fibers are guided out of the at least one fiber package store above the at least one cross member. The at least one fiber package store can be arranged next to the at least one cross member in the x direction, such that the fibers are guided out of the at least one fiber package store in the x direction and are subsequently deflected in the y direction by at least one deflection element, which is arranged on a supporting frame. This at least one deflection element can be configured as a deflection roller having a vertical rotation axis. The at least one deflection element arranged opposite the at least one fiber package store, in particular on the y carriage, can be configured as a deflection roller having a horizontal rotation axis. In various embodiments, the fiber laying machine has two fiber package stores, which are arranged on both sides of the at least one cross member in the x direction. The supporting frame can be fastened to the fiber package stores. More than two fiber package stores can also be provided, which provide fibers to the fiber laying head.

A fiber laying machine as described herein ensures quick and easy fiber laying. The at least one dancer magazine compensates for changes in the tensile stress acting on the fibers, and so the tensile stress in the fibers remains substantially constant. As a result, the fibers are stabilized along the fiber path between the at least one fiber package store and the fiber laying head and dynamic force effects are compensated, such that higher fiber laying speeds and fiber cutting speeds are allowed. Furthermore, backlash in the fiber path, which is brought about in particular by deflection points or deflection elements on the y axis and the z axis, is compensated.

A fiber laying machine as described herein ensures flexible production of laid fiber scrims. By way of the air-conditioning unit, the interior of the machine housing can be air-conditioned, allowing easy and flexible production of laid fiber scrims. Since the housing openings on the loading side and the unloading side are closable by covering elements, the air-conditioning of the interior is not impaired by the displacement of the tool table. The covering elements are configured for example as doors or link aprons. As a result of the air-conditioning, the fiber laying machine ensures optimal processing conditions. This is advantageous in particular when the fibers or impregnated fibers are hydrophilic and/or have processing properties that change with the temperature thereof. The air-conditioning in particular avoids the necessity to air-condition an entire production hall.

The disclosure is furthermore based on the object of creating a fiber laying installation which allows the production of laid fiber scrims in an easy, flexible and efficient manner.

This object is achieved by a fiber laying installation having the features as described herein. By way of the conveying device, the at least two fiber laying machines can be loaded and unloaded automatically. To this end, the molds are arranged in particular on mold pallets. The molds or mold pallets are handled or conveyed outside the fiber laying machines for example on roller conveying systems or by means of gantries. Depending on the application, a combination of these systems with industrial robots is possible. The molds or mold pallets are displaceable in particular on a guide. The fiber laying machines are arranged in series with one another and/or parallel to one another. The guide leads to the loading side and/or the unloading side of each of the fiber laying machines. The fiber laying installation according to the disclosure has a high level of productivity in the production of laid fiber scrims.

The disclosure is furthermore based on the object of creating a method which allows the production of laid fiber scrims in an easy, flexible and efficient manner.

This object is achieved by a method having the features as described herein. The advantages of the method according to the disclosure correspond to the advantages of the fiber laying machine according to the disclosure and of the fiber laying installation according to the disclosure. The method according to the disclosure can be developed in particular also by way of the features as described herein. As a result of the automatic loading and unloading of the tool table, the production of laid fiber scrims with a high level of productivity is allowed. The fiber laying machine is configured in particular in a quadraxial manner.

A method as described herein ensures a high level of productivity. Since the automatic loading and unloading of the tool table takes place on different sides of the fiber laying machine, a mold to be coated can already be provided while the fully coated mold is being unloaded. As a result, a short auxiliary production time for loading and unloading is achieved.

A method as described herein ensures a high level of productivity. Since the automatic loading and/or the automatic unloading of the fiber laying machine takes place at the same time as fiber laying, the auxiliary production time is reduced. A first handling unit which is arranged on the loading side of the fiber laying machine is loaded for example with a mold to be coated by means of a conveying device. The mold is arranged in particular on a mold pallet. This loading takes place in parallel with the main production time for the laying of fibers on a further mold which is arranged on the tool table and/or in parallel with the unloading of the tool table. Once the fiber laying operation has been completed, the mold coated with fibers is displaced to a second handling unit which is arranged on the unloading side of the fiber laying machine. The coated mold is unloaded from the tool table by means of the second handling unit. Subsequently, the tool table is displaced to the loading side, where said tool table is loaded with the provided mold by means of the first handling unit. Subsequently, the tool table is displaced again to the fiber laying head, where the new mold is coated with fibers. The mold held by the second handling unit and coated is unloaded from the fiber laying machine during the loading of the tool table and/or during the laying of fibers on the new mold. The unloading thus takes place at the same time as the loading of the tool table and/or in parallel with the main production times for fiber laying. The unloading from the fiber laying machine takes place for example by means of the conveying device. The molds are arranged in particular on mold pallets.

A method as described herein ensures quick and easy loading and unloading of the tool table. As a result of the clamping units, mold pallets with different molds can be clamped and released easily, precisely and quickly.

A method as described herein ensures quick and easy loading and unloading of the tool table. Since the tool table is linearly displaceable only in a horizontal direction, in particular in a horizontal x direction, the displacement and positioning of the tool table or the mold arranged thereon is quickly and easily possible. As a result, the productivity of the fiber laying machine is increased.

An embodiment provides a fiber laying machine for producing laid fiber scrims, having a machine frame, an x carriage which is linearly displaceable in a horizontal x direction, a tool table for positioning a mold, said tool table being arranged on the x carriage and being pivotable about a vertically extending pivot axis, a fiber laying head for laying fibers on a mold, said fiber laying head being arranged above the tool table in a vertical z direction, a fiber supply unit for supplying the fibers to be laid by the fiber laying head, characterized in that the fiber laying head is linearly displaceable by means of a y carriage in a horizontal v direction extending transversely to the x direction.

In an embodiment, the x carriage is displaceable on x guide rails which extend from a loading side of the machine frame to an unloading side of the machine frame.

In an embodiment, the tool table has a plurality of clamping units for mechanically clamping and releasing mold pallets.

In an embodiment, at least one pallet handling unit for loading the tool table with a mold pallet and/or for unloading a mold pallet from the tool table, said pallet handling unit being arranged in particular on the loading side and/or the unloading side of the machine frame.

In an embodiment, the machine frame has at least one cross member which extends in the y direction and on which the y carriage is arranged, and in particular in that at least one passage opening for the tool table is formed beneath the at least one cross member in the z direction.

In an embodiment, the machine frame has two cross members, which are spaced apart in the x direction and on which the y carriage is arranged in a displaceable manner.

In an embodiment, a z carriage is arranged on the y carriage, said z carriage being linearly displaceable in the z direction, and the fiber laying head is arranged on the z carriage and in particular in that a control unit is provided, which is configured such that the fiber laying head is displaceable in the z direction by means of the z carriage during the laying of fibers in order to produce three-dimensional laid fiber scrims.

In an embodiment, the fiber supply unit has at least one fiber package store and at least one deflection element, wherein the at least one deflection element is arranged, relative to the fiber laying head, opposite the at least one fiber package store, in particular on the y carriage.

In an embodiment, the fiber supply unit has at least one dancer magazine for compensating for dynamic effects of forces acting on the fibers.

In an embodiment, the fiber laying head is arranged inside a machine housing, in that an air-conditioning unit for air-conditioning an interior of the machine housing is provided, and in particular in that housing openings are formed in the machine housing on the loading side and on the unloading side, said housing openings being closable by covering elements.

An embodiment provides a fiber laying installation for producing laid fiber scrims, having at least two fiber laying machines as described herein, and a conveying device for loading the at least two fiber laying machines with molds which are arranged in particular on mold pallets, and/or for unloading molds, which are arranged in particular on mold pallets, from the at least two fiber laying machines.

An embodiment provides a method for producing laid fiber scrims, comprising the steps of: providing a fiber laying machine having a tool table and a fiber laying head, wherein the fiber laying machine is configured in as described herein, automatically loading the tool table with a mold which is arranged in particular on a mold pallet, laying fibers on the mold by means of the fiber laying head, and automatically unloading the mold laid with fibers, which is arranged in particular on the mold pallet, from the tool table.

In an embodiment, the automatic loading takes place on a loading side of the fiber laying machine and the automatic unloading takes place on an unloading side of the fiber laying machine, wherein the unloading side is formed in particular on the opposite side from the loading side.

In an embodiment, loading and/or unloading of the fiber laying machine with molds takes place parallel to the loading and/or to the unloading of the tool table and/or to the laying of fibers.

In an embodiment, for automatic loading and unloading, the mold pallets are mechanically clamped to the tool table by means of clamping units and released.

In an embodiment, for automatic loading and unloading, the tool table is linearly displaced in only one direction by means of a carriage.

BRIEF DESCRIPTION OF THE FIGURES

Further features, advantages and details of the disclosure can be gathered from the following description of a plurality of exemplary embodiments. In the figures.

DETAILED DESCRIPTION

Figure 1:
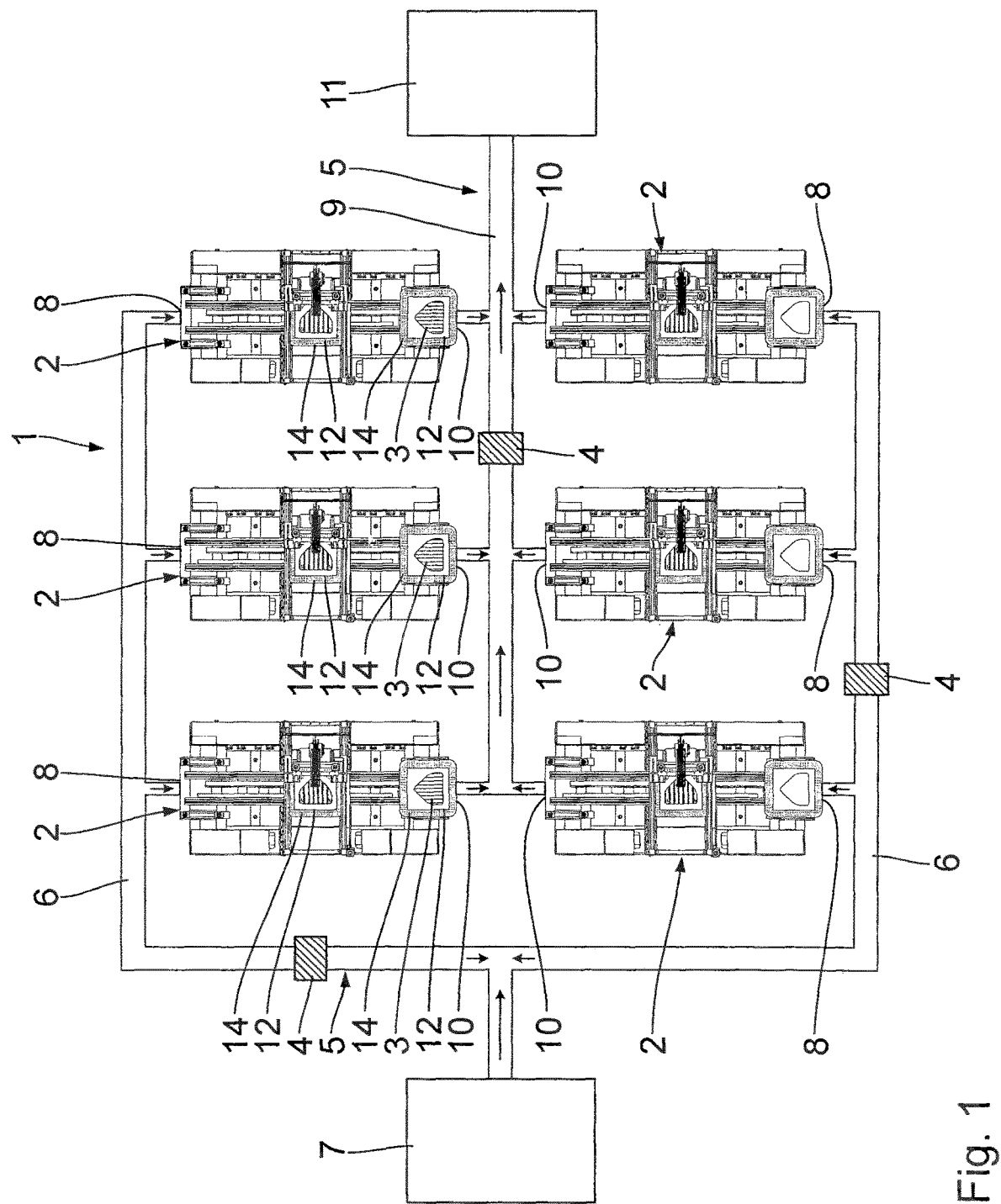
FIG. 1 shows a schematic illustration of a fiber laying installation according to a first exemplary embodiment having a plurality of fiber laying machines arranged parallel to one another for producing laid fiber scrims.
Figure 2:
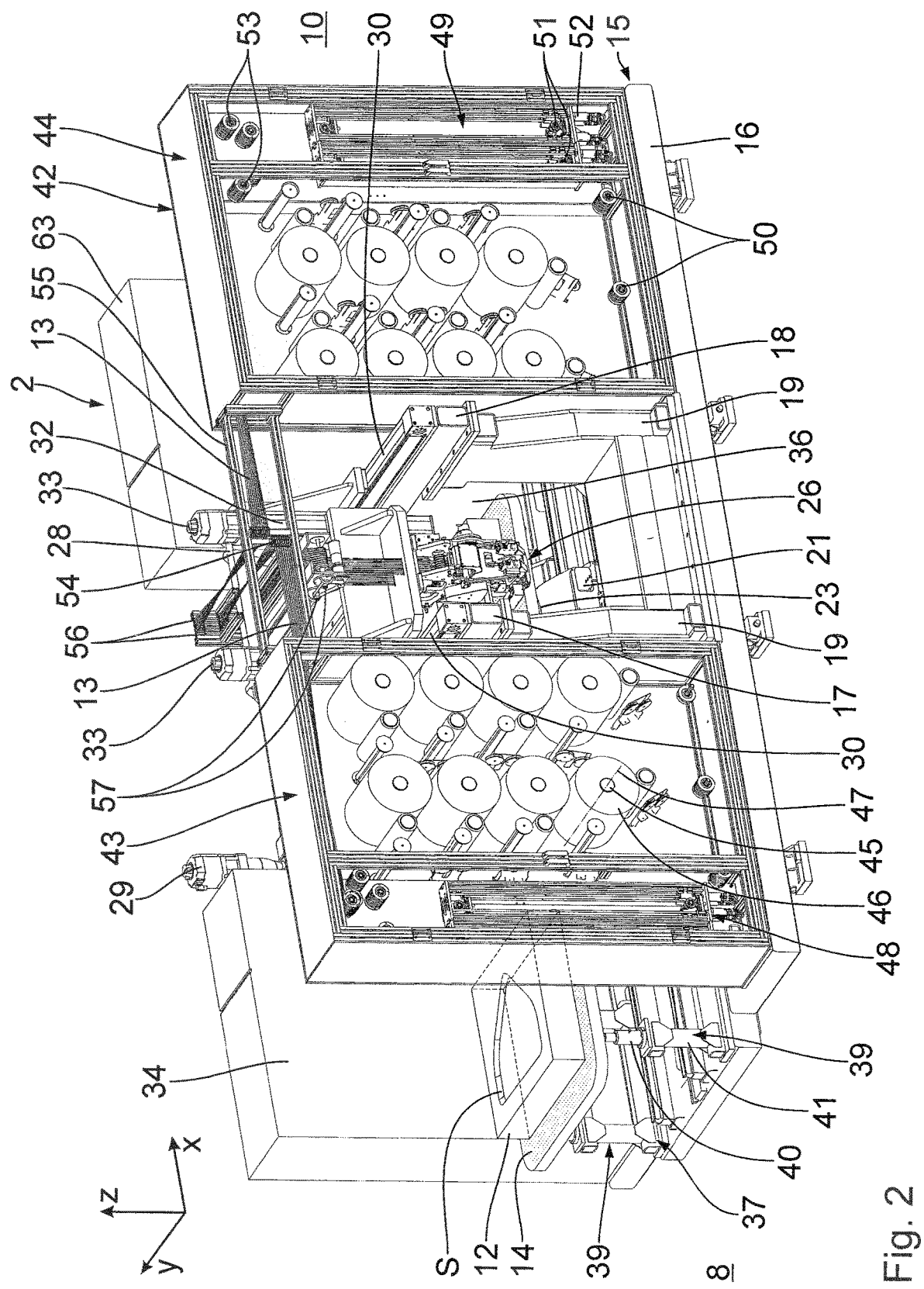
FIG. 2 shows a perspective view of a fiber laying machine of the fiber laying installation illustrated in FIG. 1.

A first exemplary embodiment is described in the following text with reference to FIGS. 1 to 4. A fiber laying installation 1 has a plurality of fiber laying machines 2 for producing laid fiber scrims 3. The fiber laying machines 2 are identical in construction. In FIG. 1, the fiber laying installation 1 has for example six fiber laying machines 2 of identical construction, which are arranged in two groups. Each group has three fiber laying machines 2, which are arranged parallel to one another.

For automatic loading and unloading of the fiber laying machines 2, the fiber laying installation 1 has a conveying device 4, 5. The conveying device has for example a plurality of conveying carriages 4 which are displaceable on a guide 5. The guide 5 has a loading section 6, which extends from a receiving point 7 to a respective loading side 8 of the fiber laying machines 2. At least one conveying carriage 4 is arranged in a displaceable manner on the loading section 6. The guide 5 furthermore has an unloading section 9, which extends from a respective unloading side 10 of the fiber laying machines 2 to a deposition point 11. At least one conveying carriage 4 is arranged in a displaceable manner on the unloading section 9.

By means of the conveying device 4, 5, uncoated molds 12, that is to say molds 12 that are to be coated with fibers 13, are displaceable from the receiving point 7 to the loading sides 8 and molds 12 that are coated with fibers 13 are displaceable from the unloading sides 10 to the deposition point 11. The molds 12 are arranged on mold pallets 14.

The fiber laying machines 2 are identical in construction, and so only one of the fiber laying machines 2 is described in the following text. The fiber laying machine 2 has a machine frame 15 having a machine bed 16 and cross members 17, 18 arranged thereon. The machine bed 16 extends substantially in a horizontal x direction and a horizontal y direction extending perpendicularly thereto. The cross members 17, 18 extend parallel to the y direction and are arranged on the machine bed 16 in a spaced apart manner in the x direction. The cross members 17, 18 are arranged in each case at both ends in a z direction above the machine bed 16 by means of longitudinal supports 19. The z direction extends perpendicularly to the x and the y direction, and so the x, y and z directions form a Cartesian coordinate system.

Arranged on the machine bed 16 are two x guide rails 20, which extend in the x direction and are spaced apart from one another in the y direction. Mounted on the x guide rails 20 is an x carriage 21, which is displaceable in the x direction between the loading side 8 and the unloading side 10 by means of an x drive motor 22. To this end, the x guide rails 20 extend in the x direction along the entire machine bed 16. Arranged on the x carriage 21 is a tool table 23, which is pivotable about a vertical pivot axis 25 by means of a c drive motor 24. The vertical pivot axis 25 is also referred to as the c axis. The c axis 25 extends parallel to the z direction. The tool table 23 is linearly displaceable only in the x direction by means of the x carriage 21.

Figure 3:
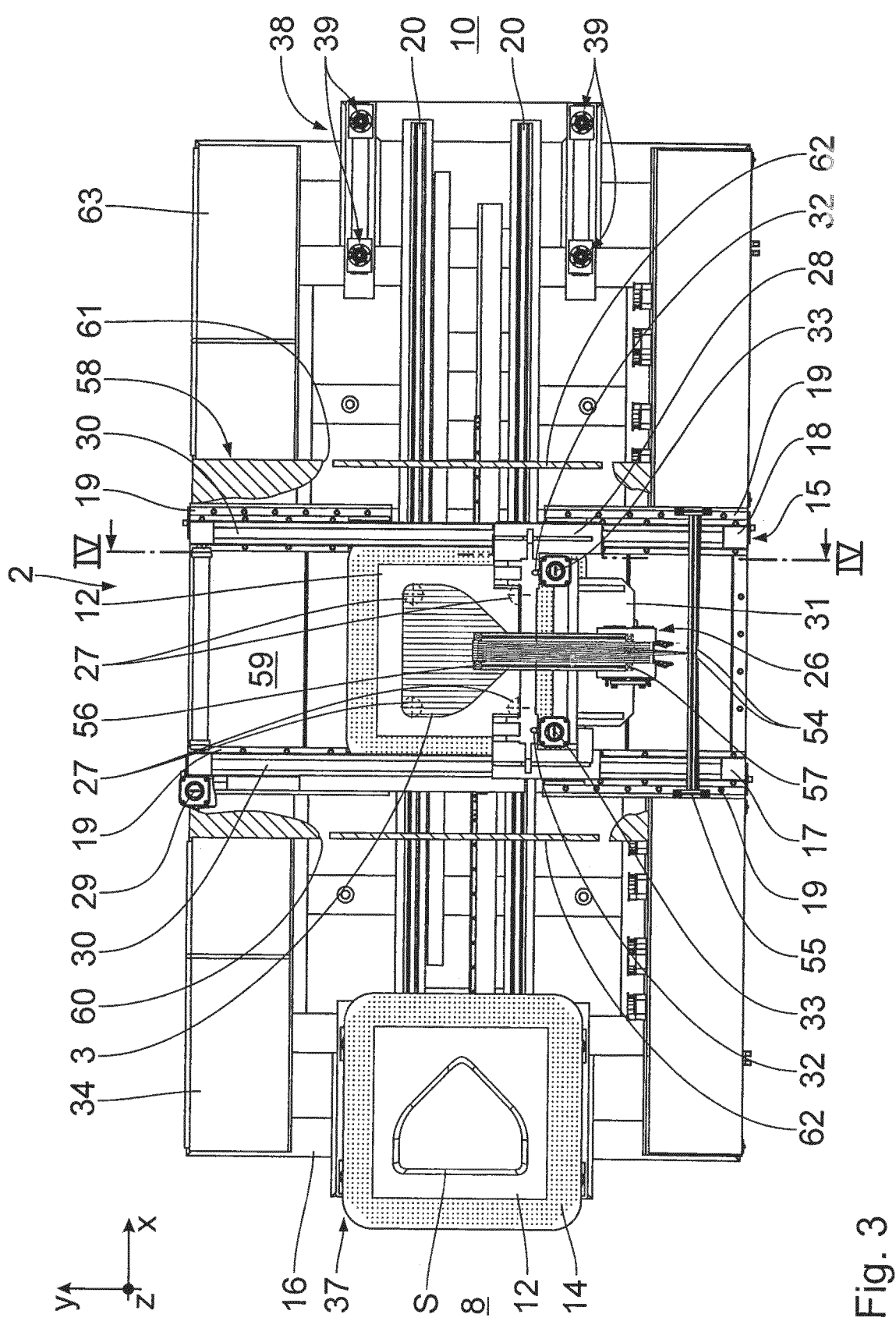
FIG. 3 shows a plan view of the fiber laying machine in FIG. 2.

The tool table 23 serves to position the respective mold 12 relative to a fiber laying head 26. In order to mechanically clamp and release the mold pallets 14 having the respective mold 12, the tool table 23 has a plurality of clamping units 27. The clamping units 27 are schematically illustrated in FIG. 3. The clamping units 27 are known in principle and are configured for example as zero-point clamps. The clamping units 27 are actuable electromechanically, hydraulically or pneumatically.

In order to lay fibers 13 on a two-dimensional or three-dimensional surface S of the respective mold 12, the fiber laying head 26 is positionable in the z direction above the tool table 23. The fiber laying head 26 is displaceable in the y direction and in the z direction. To this end, a y carriage 28, which is linearly displaceable in the y direction by means of a y drive motor 29, is mounted on the cross members 17, 18. The y carriage 28 is mounted on y guide rails 30 which are arranged on a top side of the cross members 17, 18. The y carriage 28 extends between the cross members 17, 18. In order to displace the fiber laying head 26 in the z direction, a z carriage 31 is arranged on the y carriage 28. The z carriage 31 is mounted on z guide rails 32 and is displaceable in the z direction by means of z drive motors 33. The z guide rails 32 extend parallel to the z direction and are spaced apart from one another in the x direction.

The fiber laying head 26 is arranged on the z carriage 31. In various embodiments, the fiber laying head 26 is fastened in an exchangeable manner. The fiber laying head 26 is linearly displaceable only in the y direction. Pivoting of the fiber laying head 26 on the z carriage 31 is not possible. Alternatively, the fiber laying head 26 can be pivotable about a pivot axis extending parallel to the x direction, i.e. form an a axis. As a result, three-dimensional laid fiber scrims 3 that are curved to a comparatively greater extent can be produced.

The fiber laying head 26 is linearly displaceable at least 200 mm, in particular at least 400 mm, and at least 600 mm in the z direction by means of the z carriage 31. In order to produce three-dimensional laid fiber scrims 3, a control unit 34 of the fiber laying machine 2 is configured such that the fiber laying head 26 is linearly displaceable at least 50 mm, in particular at least 100 mm, and in particular at least 150 mm over its stroke by means of the z carriage 31 during the laying of fibers 13.

In order to displace the tool table 23 in the x direction, passage openings 35, 36 for the tool table 23 are formed beneath the cross members 17, 18 and between the respectively associated longitudinal supports 19. In order to automatically load the tool table 23 with mold pallets 14, a first pallet handling unit 37 is arranged on the loading side 8, whereas, in order to automatically unload mold pallets 14 from the tool table 23, a second pallet handling unit 38 is arranged on the unloading side 10. The handling units 37, 38 are fastened to the ends of the machine bed 16 in the x direction. The pallet handling units 37, 38 are configured as lifting units which serve to raise and lower mold pallets 14. To this end, the pallet handling units 37, 38 have at least three, in particular at least four lifting elements 39. The lifting elements 39 have a piston 40 which is displaceable in the z direction in an associated cylinder 41. The lifting elements 39 are actuable electromechanically, pneumatically or hydraulically. In particular, the lifting elements 39 that belong to each particular pallet handling unit 37, 38 are actuated synchronously by means of the control unit 34 in order to raise or lower a mold pallet 14.

In order to supply the fibers 13 to be laid, the fiber laying machine 2 has a fiber supply unit 42. The fiber supply unit 41 has two fiber package stores 43, 44, wherein a first fiber package store 43 is arranged next to the first cross member 17 in the x direction and a second fiber package store 44 is arranged next to the second cross member 18. The fiber package stores 43, 44 are fastened to the ends of the machine bed 16 in the y direction. The fiber package stores 43, 44 each have a plurality of fiber package holders 45 for fiber packages 46. The fiber packages 46 are arranged on a respective fiber package holder 45 and are mounted so as to be rotatable about a respective horizontal rotation axis 47. The respective horizontal rotation axis 47 extends parallel to the y direction. The fibers 13 are feedable to a respective dancer magazine 48, 49 via guide elements 50 in the form of guide rollers, said dancer magazine 48, 49 serving to compensate for changes in a tensile stress acting on the fibers 13. The respective dancer magazine 48, 49 has deflection elements 51 in the form of deflection rollers, which are displaceable in the z direction and bias the fibers 13 by means of weights. The deflection elements 51 are also referred to as dancers. By way of the displacement of the deflection elements 51, dynamic effects, which on the one hand are brought about by the inertia of the fiber packages 46 and on the other hand are caused by irregular conveying of the fibers 13 in the event of individual fibers 13 being cut during the deposition of fibers 13, are able to be compensated. The fibers 13 are deflectable via guide elements 53 in the form of guide rollers and are able to be guided out of the respective fiber package store 43, 44. The position of the deflection elements 51 is adjusted during operation of the dancer magazines 48, 49. To this end, use is made of sensors 52 which determine the deviation of the deflection elements 51 in the z direction. The deviation in the z direction is adjusted about a nominal position in that the fiber package holders 45 are equipped with an adjustable brake.

The fibers 13 emerge from the fiber package stores 43, 44 in the x direction and are deflected in the y direction by vertically arranged deflection elements 54 which form a vertical deflection axis. The deflection elements 54 are configured as deflection rollers. The deflection elements 54 are mounted on a supporting frame 55 which is fastened between the fiber package stores 43, 44. Horizontal deflection elements 46 in the form of deflection rollers, which deflect the fibers 13 initially from the y direction into the z direction and subsequently from the z direction back into the y direction, are arranged on a side of the y carriage 28 that is remote from the fiber laying head 26 and the fiber package stores 43, 44. The deflection elements 56 form horizontal deflection axes. Between the y carriage 28 and the fiber package stores 43, 44, further horizontal deflection elements 57 are arranged above the z carriage 31. The deflection elements 57 form horizontal deflection axes and deflect the fibers 13 from the y direction into the z direction to the fiber laying head 26. The deflection elements 57 are configured as deflection rollers. The structure of the fiber laying head 26 is known.

Figure 4:
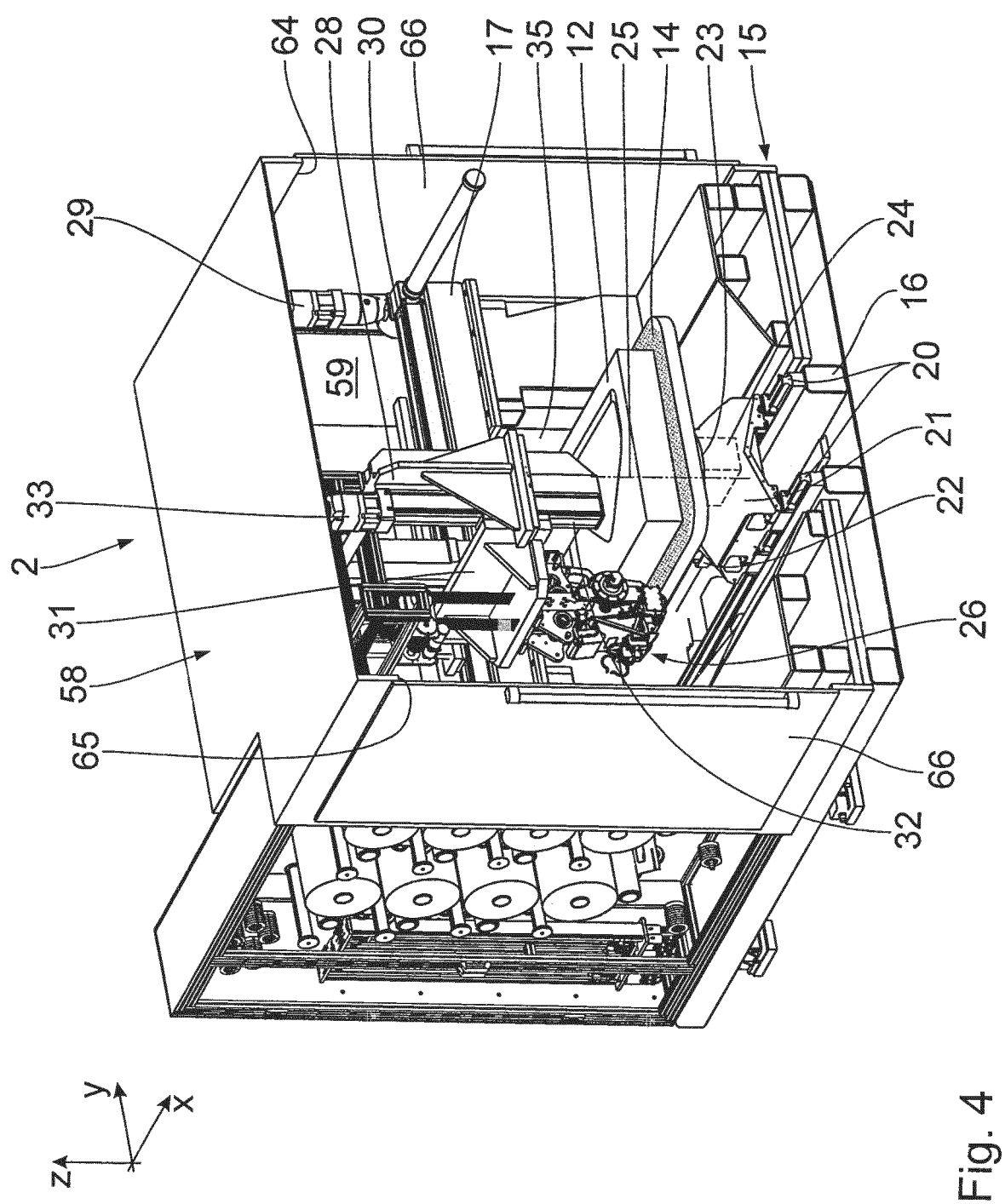
FIG. 4 shows a perspective sectional illustration through the fiber laying machine along the section line IV-IV in FIG. 3.

The fiber laying machine 2 has a machine housing 58 which is illustrated only in FIGS. 3 and 4. The machine housing 58 bounds an interior 59 in which the longitudinal supports 19 having the cross members 17, 18, and the y carriage 28, the z carriage 31 and the fiber laying head 26 are arranged. The machine housing 58 has a first housing opening 60 in the direction of the loading side 8 and a second housing opening 61 in the direction of the unloading side 10, it being possible for said housing openings 60, 61 to be tightly closed and opened by respective covering elements 62. The housing openings 60, 61 and the associated covering elements 62 are merely outlined in FIG. 3. The covering elements 62 are configured for example as doors or link aprons.

In order to air-condition the interior 59, the fiber laying machine 2 has an air-conditioning unit 63 which is arranged on the machine bed 16. In order to access the interior 59, two further housing openings 64, 65 are formed in the machine housing 58, said housing openings 64, 65 leading into the interior 59 between the respectively adjacent longitudinal supports 19. The housing openings 64, 65 are closable by means of doors 66.

The mode of operation of the fiber laying installation 1 and of the fiber laying machine 2 is as follows:

The fiber laying machines 2 are loaded automatically with mold pallets 14, on which molds 12 to be coated are arranged, by means of the conveying device 4, 5. To this end, the at least one conveying carriage 4 is displaced from the receiving point 7 on the loading section 6 of the guide 5 to the respective loading side 8 of the fiber laying machines 2.

Loading takes place in that the conveying device 4, 5 feeds the mold pallet 14 to the first pallet handling unit 37. The first pallet handling unit 37 can be in a raised position. If the first pallet handling unit 37 is not in a raised position, it is transferred into a raised position before or after loading. The loading of the respective fiber laying machine 2 takes place at the same time as the laying of fibers 13 and/or as the unloading of the tool table 23.

While the first pallet handling unit 37 is providing a mold 12 to be coated on the loading side 8, a laid fiber scrim 3 is produced by means of the fiber laying head 6. To this end, a mold pallet 14 having a mold 12 arranged thereon is clamped on the tool table 23 by means of the clamping units 27. The tool table 23 is linearly displaced in the x direction by means of the x carriage 21 during fiber laying and, in order to achieve a desired fiber orientation, is pivoted about the pivot axis 25 by means of the c drive motor 24. Furthermore, the fiber laying head 26 is displaced in the y direction by means of the y carriage 28 and in the z direction by means of the z carriage 31 during fiber laying. As a result of the fiber laying head 26 being displaced in the z direction, in particular a three-dimensional laid fiber scrim 3 is producible.

Once the laid fiber scrim 3 has been completed, the x carriage 21 is displaced in the x direction to the unloading side 10. The second pallet handling unit 38 is in a lowered position there. In order to automatically unload the mold pallet 14, the latter is released from the tool table 23 by means of the clamping units 27. Subsequently, the lifting elements 39 of the second pallet handling unit 38 are transferred from the lowered position into the raised position, such that the mold pallet 14 with the fully coated mold 12 is unloaded automatically from the tool table 23.

Subsequently, the x carriage 21 is displaced from the unloading side 10 to the loading side 8, where the first pallet handling unit 37 is keeping the next mold pallet 14 available in the raised position. If the tool table 23 is located below the mold pallet 14, the lifting elements 39 of the first pallet handling unit 37 are transferred from the raised position into the lowered position, with the result that the mold pallet 14 is arranged on the tool table 23. The mold pallet 14 is subsequently clamped on the tool table 23 by means of the clamping units 27. The tool table 23 is now displaced in the x direction to the fiber laying head 26 for the next fiber laying operation, such that said fiber laying head 26 can start the new fiber laying operation. The lifting elements 39 of the first pallet handling unit 37 are transferred back into the raised position for new loading.

The automatic unloading of the fiber laying machines 2 takes place by means of the conveying device 4, 5, which leads from the respective unloading side 10 to the deposition point 11. The unloading of the respective fiber laying machine 2 takes place at the same time as the loading of the tool table 23 with a mold pallet 14 and with a mold 12 to be coated arranged thereon and/or at the same time as the coating of the mold 12 with fibers 13. For unloading, the conveying carriage 4 acquires the mold pallet 14 and the mold 12 arranged thereon from the second pallet handling unit 38 and is displaced from the respective unloading side 10 on the unloading section 9 of the guide 5 to the deposition point 11. The lifting elements 39 of the second pallet handling unit 38 are transferred into the lowered position after unloading, such that the tool table 23 can be unloaded again.

The housing openings 60, 61 of the air-conditioned machine housing 58 are predominantly closed by means of the covering elements 62 and are only opened when the tool table 23 is displaced from the loading side 8 to the fiber laying head 26 or from the fiber laying head 26 to the unloading side 10 or from the unloading side 10 to the loading side 8.

The fibers 13 are laid unidirectionally when the fiber laying head 26 is displaced in the y direction to the fiber package stores 43, 44. During this displacement operation, the distance between the vertical deflection elements 54 and the horizontal deflection elements 56 is shortened, such that no fibers 13 have to be pulled out of the fiber package stores 43, 44 during the fiber laying operation. As a result, fiber laying can take place comparatively quickly. During the return displacement of the fiber laying head 26 away from the fiber package stores 43, 44, the fibers 13 are then pulled out of the fiber package stores 43, 44 for the next fiber laying operation. Changes in the tensile stress in the fibers 13 are compensated by means of the dancer magazines 48, 49.

Figure 5:
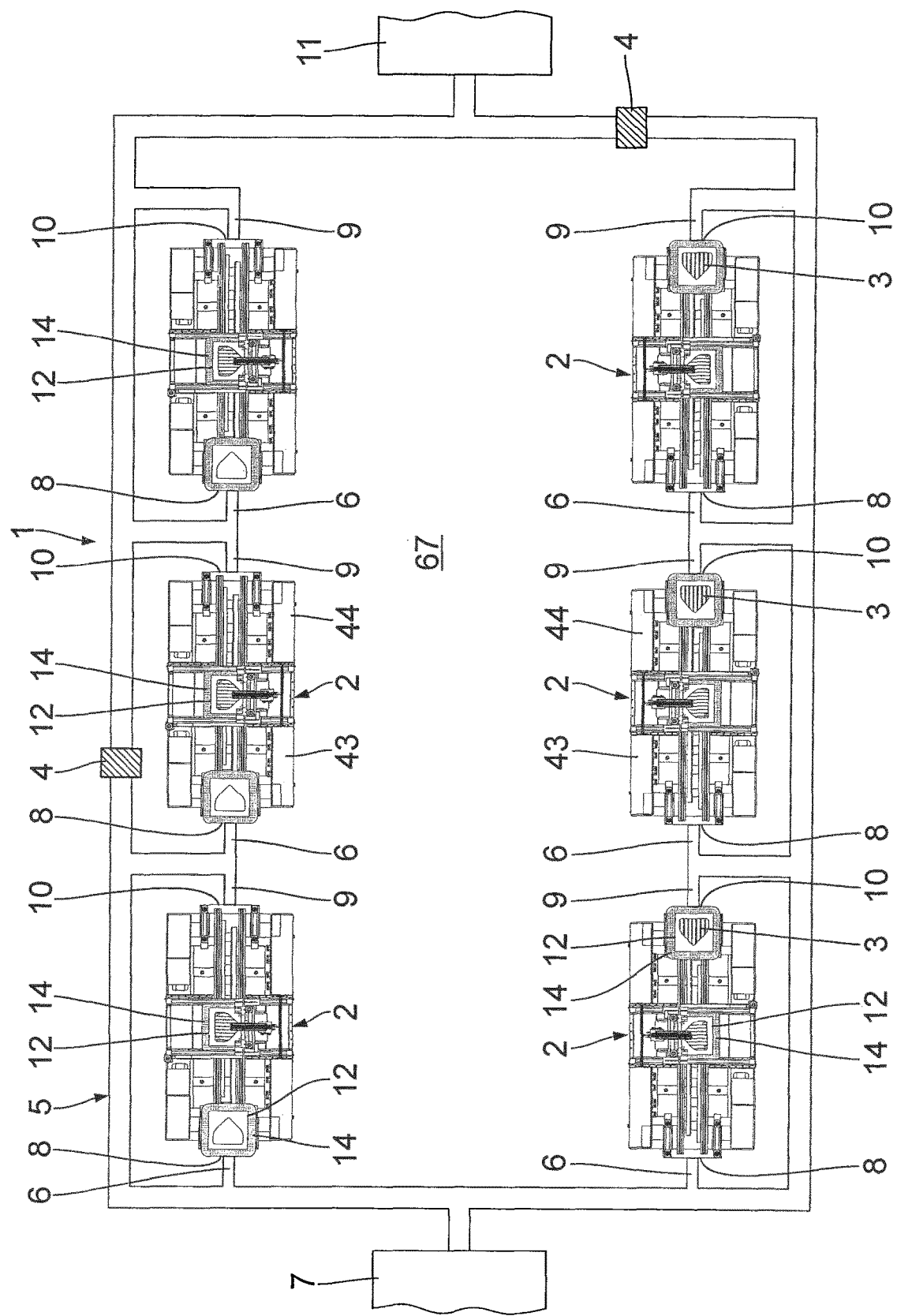
FIG. 5 shows a schematic illustration of a fiber laying installation according to a second exemplary embodiment having fiber laying machines arranged in series with one another for producing laid fiber scrims.

In the following text, a second exemplary embodiment is described with reference to FIG. 5. In contrast to the first exemplary embodiment, the fiber laying machines 2 are arranged in series with one another in two groups. The guide 5 is configured such that the conveying carriages 4 are displaceable to the loading side 8 and the unloading side 10 of each of the fiber laying machines 2 via a respective loading section 6 and a respective unloading section 9. The fiber package stores 43, 44 of the respective fiber laying machine 2 are arranged facing an intermediate space 67. The intermediate space 67 is formed by the two series of fiber laying machines 2. Arranged in the intermediate space 67 is for example a store having fiber packages 46 for re-equipping the fiber package stores 43, 44. With regard to the further structure and the further operation of the fiber laying installation 1 and the fiber laying machines 2, reference is made to the preceding exemplary embodiment.

In general, the following applies: the fiber laying machines 2 allow the laying of fiber stacks of tow-preg material and/or slit-tow material and/or dry fibers 13, which can be provided with a binder. The fibers 13 can be carbon fibers and/or glass fibers. The laid fiber scrims 3 can be produced with any desired fiber orientation and/or contour. The fiber laying machines 2 function autonomously. In order to load and unload the fiber laying machines 2, the fiber laying installation 1 can have a superordinate control device. The fiber laying machines 2 are incorporated in particular into a production line in order to achieve a high level of productivity. Each particular fiber laying machine 2 is configured in a quadraxial manner. If the fiber laying head 26 is pivotable about an additional a axis, the respective fiber laying machine 2 is configured in a quintaxial manner. With the respective fiber laying machine 2, both two-dimensional and three-dimensional laid fiber scrims 3 can be produced. The fiber laying head 26 is linearly displaceable in two axes. In particular, the fiber laying head 26 is linearly displaceable only in two axes, specifically in a horizontal y axis and a vertical z axis. The tool table 23 is linearly displaceable in one axis and pivotable about a pivot axis 25. In particular, the tool table 23 is only linearly displaceable in an x axis and pivotable about a vertical c axis. This combination of axes allows easy, flexible and efficient production of two-dimensional and three-dimensional laid fiber scrims 3 with any desired fiber orientation and/or contour.

The fiber laying head 26 is configured in a multitrack manner and includes the usual functions, for example cutting of the fibers 13 in motion, clamping and driving the fibers 13, wherein each function is available individually for the fibers 13. The fiber laying head 26 is exchangeable for maintenance purposes. The loading of the fiber laying machine 2 and/or of the tool table 23 takes place automatically. To this end, the conveying device 4, 5 and the pallet handling unit 37 are provided. In a corresponding manner, the unloading of the tool table 23 and/or of the fiber laying machine 2 takes place automatically. To this end, the pallet handling unit 38 and the conveying device 4, 5 are provided.

The conveying device can also be configured such that, by means of the guide itself, the molds 12 or the mold pallets 14 are displaceable. To this end, the guide forms for example a roller conveyor or belt conveyor. Conveying carriages are then not required. The pallet handling units 37, 38 are for example a pallet changer. The fiber laying machine 2 is accessible from two opposite sides for loading and unloading. In particular, mold pallets 14 can be loaded through the fiber laying machine 2 from one side to the other. As a result of this loading through, the fiber laying machine 2 is suitable for integration into production lines. With the fiber laying machine 2, laid fiber scrims 3 having a size of 1500 mm×1500 mm×100 mm can be produced, for example. Such laid fiber scrims 3 are used for example in the automotive industry.

The invention claimed is:

1. A fiber laying machine for producing laid fiber scrims, comprising:
   a machine frame;
   a machine bed which extends in a horizontal x direction and in a horizontal y direction is fixed to the machine frame;
   an x carriage disposed on the machine bed or disposed on x guide rails disposed on the machine bed, wherein the x carriage is linearly displaceable in the horizontal x direction,
   a tool table for positioning a mold, said tool table being arranged on the x carriage and being pivotable relative to the x carriage about a vertically extending pivot axis,
   a fiber laying head for laying fibers on a mold, said fiber laying head being arranged above the tool table in a vertical z direction, wherein the fiber laying head is arranged on the machine frame,
   a fiber supply unit configured to supply the fibers to be laid by the fiber laying head, and
   an air-conditioning unit,
   wherein the fiber laying head is linearly displaceable by a y carriage in the horizontal y direction extending transversely to the horizontal x direction,
   wherein the fiber laying head is disposed within a machine housing, and the air-conditioning unit is configured for selectively air-conditioning an interior of the machine housing,
   wherein the machine housing comprises a first covering element and the machine housing defines a first housing opening, wherein the first housing opening is closable by the first covering element.

2. The fiber laying machine as claimed in claim 1, wherein the x carriage is displaceable on x guide rails which extend from a loading side of the machine frame to an unloading side of the machine frame.

3. The fiber laying machine as claimed in claim 1, wherein the tool table has a plurality of clamping units configured to mechanically clamp and release mold pallets.

4. The fiber laying machine as claimed in claim 1, comprising at least one pallet handling unit configured to load the tool table with a mold pallet and/or for unloading a mold pallet from the tool table.

5. The fiber laying machine as claimed in claim 1, wherein the machine frame has at least one cross member which extends in the horizontal y direction and on which the y carriage is arranged.

6. The fiber laying machine as claimed in claim 1, wherein the machine frame has two cross members, which are spaced apart in the horizontal x direction and on which the y carriage is arranged in a displaceable manner.

7. The fiber laying machine as claimed in claim 1, wherein a z carriage is arranged on the y carriage, said z carriage being linearly displaceable in the vertical z direction, and the fiber laying head is arranged on the z carriage.

8. The fiber laying machine as claimed in claim 1, wherein the fiber supply unit has at least one fiber package store and at least one deflection element, wherein the at least one deflection element is arranged, relative to the fiber laying head, opposite the at least one fiber package store.

9. The fiber laying machine as claimed in claim 1, wherein the fiber supply unit has at least one dancer magazine for compensating for dynamic effects of forces acting on the fibers.

10. The fiber laying machine as claimed in claim 4, wherein the at least pallet handling unit is arranged on a loading side or an unloading side of the machine frame.

11. The fiber laying machine as claimed in claim 5, wherein at least one passage opening for the tool table is formed beneath the at least one cross member in the horizontal z direction.

12. The fiber laying machine as claimed in claim 7, wherein a control unit is provided, which is configured such that the fiber laying head is displaceable in the horizontal z direction by the z carriage during the laying of fibers in order to produce the laid fiber scrims.

13. The fiber laying machine as claimed in claim 1, wherein the machine housing further comprises a second covering element and defines a second housing opening, wherein the first housing opening is defined on a loading side and the second housing opening is defined on an unloading side, the second housing opening being closable by the second covering element.

* * * * *